Aug. 5, 1952   A. P. HELDENBRAND   2,606,034
LATHE ATTACHMENT
Filed Oct. 6, 1950

INVENTOR.
A. P. Heldenbrand
BY
C. M. McKnight
ATTORNEY

Patented Aug. 5, 1952

2,606,034

UNITED STATES PATENT OFFICE 2,606,034

LATHE ATTACHMENT

Arthur P. Heldenbrand, Oklahoma City, Okla.

Application October 6, 1950, Serial No. 188,849

1 Claim. (Cl. 279—60)

This invention relates to an attachment for machine lathes and more particularly, but not by way of limitation, to a drill chuck to be utilized with a lathe tail stock for drilling centering holes.

It is well known to those skilled in the art that a large portion of the stock that is to be machined on a lathe must first be provided with a center hole in the outer end thereof to receive the tailstock centering tool when the stock is being machined. One of the conventional methods of drilling centering holes is by use of the lathe itself, which entails the replacement of the tailstock centering tool with a drill chuck having a tapered shank adapted to fit in the tailstock spindle, and then securing the stock to be machined in the headstock chuck. The center hole is then drilled by rotating the stock through the medium of the headstock and headstock chuck while simultaneously moving the centering drill into the outer end of the stock by operation of the tailstock hand wheel. Since the tailstock spindle may be moved only a limited amount, the entire tailstock assembly must be unbolted from the lathe bed and moved away from the stock to permit the replacement of the drill chuck with the centering tool after the centering hole has been drilled. The tailstock is then again moved into operating position and bolted to the lathe bed, whereupon the stock may be machined.

The present invention contemplates a novel drill chuck that may be placed over the forward tapered end or nose of a tailstock centering tool, principally for the purpose of drilling center holes in stock or work to be machined. The drill chuck may be installed on or removed from the centering tool with the tailstock in normal operating position and the work installed in the headstock of the lathe, thereby eliminating the numerous time entailing movements of the entire tailstock assembly presently required with conventional drill chucks.

An important object of this invention is to provide a drill chuck adapted to be placed on the centering tool of a lathe tailstock.

Another object of this invention is to provide a drill chuck for use with a tailstock centering tool capable of accommodating variable sized center drills.

A further object of this invention is to eliminate the necessity of moving the entire tailstock assembly when drilling centering holes with a lathe.

A still further object of this invention is to provide a drill chuck for use with a tailstock centering tool which may be economically manufactured.

Other objects and advantages of the invention will be evident from the following detailed description, read in conjunction with the accompanying drawings, which illustrate my invention.

Figure 1:
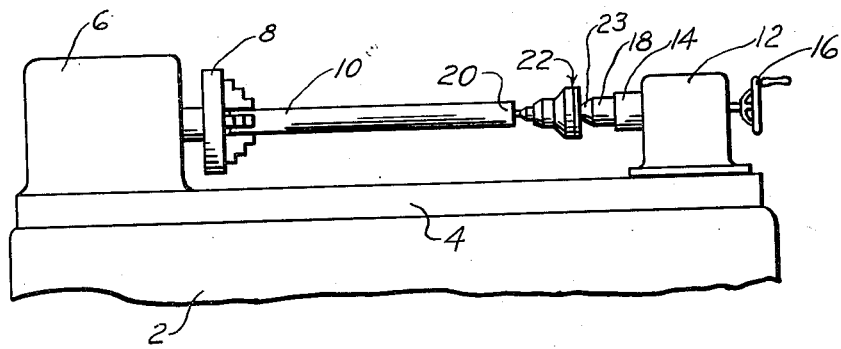
Figure 1 is a schematic elevational view of a lathe utilizing a novel drill chuck.

Referring to the drawings in detail and particularly Fig. 1, reference character 2 designates a suitable lathe having the usual bed 4. A headstock 6 is provided on one end of the bed 4 and is adapted to drive a chuck 8 in the usual manner. The chuck 8 is utilized to clamp and rotate one end of the stock or work 10 to be machined. A tailstock 12 is disposed on the bed 4 in spaced relation to the headstock 6 and is adapted to be moved along the bed 4 in the usual manner. The tailstock 12 is secured to the bed 4 by a plurality of bolts (not shown), and when it is desired to change the position of the tailstock 12, the bolts (not shown) must be removed and then replaced after the positioning of the tailstock 12. A spindle 14 is carried by the tailstock 12 and is adapted to be moved in and out of the tailstock 12 to a limited degree by operating the hand wheel 16 in the usual manner. A centering tool 18 having a tapered shank (not shown) is frictionally secured in the spindle 14.

Figure 2:
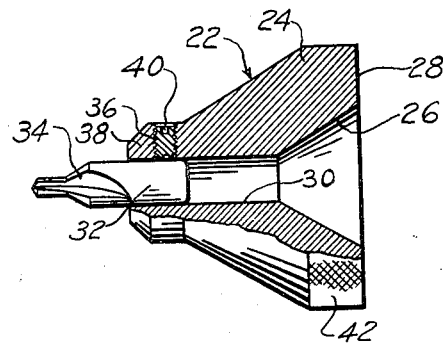
Figure 2 is a longitudinal sectional view of a novel drill chuck partially in elevation.

A novel drill chuck, designated generally at 22 (see also Fig. 2), is disposed on the forward tapered end or nose 23 of the centering tool 18. The drill chuck 22 is provided with an essentially conical shaped body portion 24 having a tapered bore 26 conforming to the tapered nose 23 of the centering tool 18 and communicating with the large or rear end 28 of the body 24. As a practical consideration, the bore 26 is of sufficient length to receive approximately 60% of the tapered portion 23 to adequately support and align the drill chuck 22 on the centering tool 18. A longitudinal bore 30 communicates with the tapered bore 26 and is adapted to receive the shank 32 of suitable centering drill 34. A transverse aperture 36 is provided in the small forward end 38 of the drill chuck body 24 and communicates with the longitudinal bore 30. A suitable set screw 40 is threadedly secured in the transverse aperture 36 in contact with the shank 32 of the drill 34 to secure the drill 34 rigidly in the body 24. A portion 42 of the body 24 adjacent the large end 28 thereof may be knurled to facilitate maintaining the chuck 22 on the centering tool 18 by hand. It will be readily appreciated that a plurality of bushings (not shown) having variable sized inner diameters may be utilized in the longitudinal bore 30 to accommodate variable sized center drills 34.

In operation, the stock 10 is secured in the headstock chuck 8, and the drill chuck 22 is placed over the nose 23 of the centering tool 18. The stock 10 is then rotated by the headstock 6 and headstock chuck 8 while simultaneously moving the center drill 34 into the end 20 of the stock 10 by turning the hand wheel 16. During the drilling operation, the chuck 22 may be retained on the centering tool 18 manually by gripping the knurled portion 42 of the chuck body 24. The chuck 22 may, of course, be retained on the centering tool 18 by a suitable wrench (not shown) if desired.

After the center hole (not shown) has been drilled, the spindle 14 is moved rearwardly in the tailstock 12 by operating the handle 16 to remove the drill 34 from the stock 10. The spindle 14 may be moved sufficiently far in the tailstock 12 to provide the necessary space between the drill 34 and the end 20 of the stock 10 to permit the removal of the chuck 22, without the necessity of unbolting and moving the tailstock 12.

Figure 3:
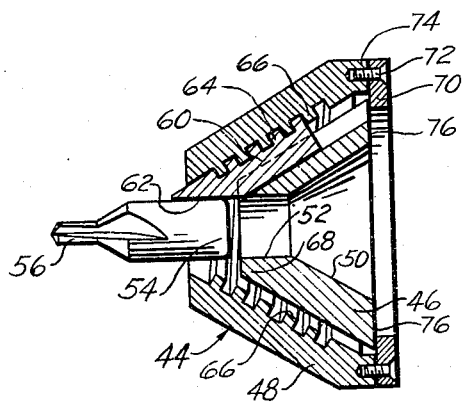
Figure 3 is a longitudinal sectional view of a modified drill chuck.
Figure 4:
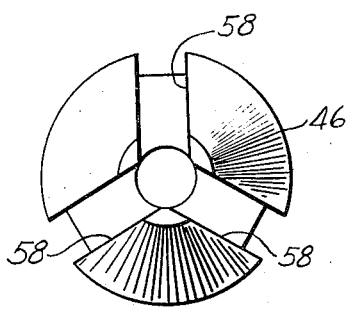
Figure 4 is a front elevational view of the inner chuck body of the drill chuck shown in Fig. 3.

Referring to Figs. 3 and 4, reference character 44 designates a modified drill chuck. The chuck 44 comprises an inner chuck body 46 and an outer chuck body 48. The inner chuck body 46 is essentially conical shaped and is provided with a tapered bore 50 conforming to the tapered nose 23 of the centering tool 18. A longitudinal bore 52 communicates with a tapered bore 50 to receive the shank 54 of a suitable center drill 56, as will be hereinafter set forth. A plurality of slots 58 (preferably three, but not limited thereto) are provided in circumferentially spaced relation in the outer periphery of the inner chuck body 46. The slots 58 extend the length of the body 46 and are adapted to slidingly receive chuck jaws 60. The forward end 62 of each chuck jaw 60 is tapered as clearly shown in Fig. 3 to efficiently clamp or secure the drill 56 in the body 46. Suitable threads 64 are provided on the outer periphery of each chuck jaw 60 and are adapted to mate with threads 66 provided on the inner periphery of the conical shaped outer chuck body 48. It is readily seen that upon rotation of the outer chuck body 48, the chuck jaws 60 are moved toward or away from the small end 68 of the inner chuck body 46, depending upon the direction of rotation of the body 48. An annular retaining ring 70 is secured by a plurality of screws 72 to the rear end 74 of the outer chuck body 48 in contact with the rear end 76 of the inner chuck body 46 to retain the inner and outer chuck bodies 46 and 48 in assembled relation.

The modified drill chuck 44 is utilized in the same manner as the preferred drill chuck 22. It will be apparent that the outer chuck body 48 may be rotated relative to the inner chuck body 46 to move the chuck jaws 60 in or out to accommodate variable sized drills 56 and to clamp the drill 56 in the chuck 44. A pair of diametrically opposed apertures (not shown) may be provided in the rear end 76 of the inner chuck body 46 to receive a dowel span wrench to facilitate retaining the chuck 44 on the centering tool 18 during the drilling operation.

It will be readily appreciated that either the preferred chuck 22 or the modified chuck 44 may be utilized with any suitable drill (not shown) when it is desired to perform other drilling operations with the lathe 2.

From the foregoing, it is apparent that the present invention provides a simple drill chuck that may be utilized with the centering tool of a lathe tailstock. Furthermore, the present invention eliminates the necessity of moving the entire tailstock assembly when drilling centering holes with a lathe. In addition, the present novel drill chuck is capable of accommodating variable sized drills.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

In a drill chuck for use with a lathe tailstock centering tool, comprising a conical shaped inner body portion, a tapered bore in said inner body portion for receiving the outer tapered end of the centering tool, a plurality of circumferentially spaced slots in the outer surface of said inner body portion, jaws in said slots constructed and arranged to clamp a drill to said body portion, said jaws having threads on their outer peripheries, a conical shaped outer body portion telescoped over said inner body portion, internal threads on said outer body portion cooperating with said threads on said jaws to simultaneously move said jaws upon rotation of said outer body portion relative to said inner body portion, and retaining means for retaining said outer body portion in assembled relation with said inner body portion.

ARTHUR P. HELDENBRAND.

REFERENCES CITED

The following references are of record in the file of this patent:

UNITED STATES PATENTS

| Number | Name | Date |
| --- | --- | --- |
| 994,581 | Fay | June 6, 1911 |
| 1,773,034 | Englund | Aug. 12, 1930 |
| 1,775,993 | Emrick | Sept. 16, 1930 |
| 2,481,939 | Miller | Sept. 13, 1949 |